United States Patent [19]

Kinugasa et al.

[11] Patent Number: 5,445,806
[45] Date of Patent: Aug. 29, 1995

[54] PROCESS FOR PREPARING FINE POWDER OF PEROVSKITE-TYPE COMPOUND

[75] Inventors: Masanori Kinugasa, Tatsuno; Naoto Tsubomoto; Osamu Kobayashi, both of Osaka, all of Japan

[73] Assignee: Tayca Corporation, Osaka, Japan

[21] Appl. No.: 845,670

[22] Filed: Mar. 4, 1992

Related U.S. Application Data

[63] Continuation-in-part of Ser. No. 684,917, filed as PCT/JP90/01032, Aug. 13, 1990, abandoned.

[30] Foreign Application Priority Data

Aug. 21, 1989 [JP]   Japan ................... 1-215198

[51] Int. Cl.$^6$ ............... C01G 23/00; C01G 25/00; C01F 11/00; C01F 5/00
[52] U.S. Cl. ................... 423/598; 423/593; 423/594
[58] Field of Search ............ 423/593, 594, 598

[56] References Cited

U.S. PATENT DOCUMENTS

| | | | |
|---|---|---|---|
| 3,923,675 | 12/1975 | Mazdiyasni et al. | 252/62.9 |
| 4,086,649 | 4/1978 | Hanold, III | 501/137 |
| 4,520,004 | 5/1985 | Uedaira et al. | 423/598 |
| 4,636,378 | 1/1987 | Pastor et al. | 423/598 |
| 4,670,243 | 6/1987 | Wilson et al. | 423/598 |
| 4,764,493 | 8/1988 | Lilley et al. | 501/137 |
| 4,829,033 | 5/1989 | Menashi et al. | 423/619 |
| 4,832,939 | 5/1989 | Menashi et al. | 423/598 |
| 4,859,448 | 8/1989 | Klee et al. | 423/598 |
| 4,898,843 | 2/1990 | Matushita et al. | 501/136 |
| 4,968,498 | 11/1990 | Wautier et al. | 423/593 |

OTHER PUBLICATIONS

Mazdiyasni et al., "Preparation of High-Purity Submicron Barium Titanate Powders," Jrn of the Amer. Cer. Soc. vol. 52, No. 10, Oct. 21, 1969, pp. 523-526.

Mazdiyasni et al., "Synthesis of $Nb_2O_5$-Doped $BaTiO_3$ with Improved Electrical Properties," Jrn of the Amer. Cer. Soc., vol. 55, No. 12, Dec., 1972, pp. 633-634.

*Primary Examiner*—Steven Bos
*Attorney, Agent, or Firm*—Varndell Legal Group

[57] ABSTRACT

A process for preparing a fine powder of perovskite-type compounds having an average particle size of at most 0.3 μm and uniform particle sizes, which comprises subjecting to a reaction an aqueous solution of a mixture of at least one compound selected from group A element compounds comprising alkaline earth metal elements and/or bivalent metal elements with at least one compound selected from group B element compounds comprising tetravalent metal elements such as Ti, Zr, Hf and Sn and/or composite metal elements composed of a bivalent or trivalent metal element such as Zn, Ni, Co, Mg, Fe or Sb and a pentavalent metal element such as Nb or Sb in an A/B atomic ratio of more than 1, calcining the resulting powdery reaction product at a temperature which is lower than the temperature at which the growth of particles takes place and which is higher than the temperature at which the growth of particles takes place when A/B is 1, and cleaning the calcined product with an acid solution to remove the excess group A elements. The process provides fine powders of perovskite-type compounds having a good crystallinity, particularly tetragonal barium titanate, which are useful particularly as raw materials of ceramics for electronic devices.

12 Claims, 4 Drawing Sheets

Diffraction Angle 2θ (degree)

FIG.4B

Diffraction Angle 2θ (degree)

PROCESS FOR PREPARING FINE POWDER OF PEROVSKITE-TYPE COMPOUND

CROSS-REFERENCE TO RELATED APPLICATION

This is a continuation-in-part application of International Application No. PCT/JP90/01032, filed Aug. 13, 1990, which entered the national phase and was assigned U.S. Ser. No. 07/684,917 filed on Apr. 19, 1991, now abandoned.

BACKGROUND OF THE INVENTION

The present invention relates to a process for preparing perovskite-type compound powders used as raw materials of ceramics.

In recent years, with the production of miniaturized light-weight high performance electronic devices there has been a demand to form thin films or to miniaturize ceramics of perovskite-type compounds used in capacitors, thermisters, etc. for the devices. Consequently, the formation of thin films and miniaturization have been investigated from the viewpoints of techniques for the production of ceramics such as formulation, forming and firing.

However, perovskite-type compounds which have been used as the raw materials are those obtained by a solid phase reaction and the average particle size thereof is at least 0.8 $\mu$m. Accordingly, even if techniques for the production of skillfully ceramics are skillfully used, the obtained ceramics have a limit in achievable thin film formation and miniaturization, and it has not been possible to achieve sufficient thin film and miniaturation.

That is to say, since the conventionally used perovskite-type compounds are prepared by admixing a carbonate or oxide of at least one member selected from metal elements (hereinafter referred to as group A elements) such as Mg, Ca, Sr, Ba and Pb with an oxide of at least one member selected from metal elements (hereinafter referred to as gruop B elements) such as Ti, Zr, Hf and Sn, and calcining the mixture at a high temperature of not less than 1,000° C. to produce perovskite-type compounds, and thereafter mechanically pulverizing the compounds by a ball mill or the like, the particulate perovskite-type compounds having an average particle size of not less than 0.8 $\mu$m have only been obtained. Consequently, as mentioned above, ceramics molded using them as the raw material have possessed the problem that miniaturization and thin film formation cannot be sufficiently achieved.

In order to solve such a problem, in Japanese Patent Publication Kokai No. 59-39726, No. 61-91016, No. 60-90825 and No. 61-31345 there is proposed a process for preparing a fine particulate perovskite-type compound having an average particle size of at most 0.2 $\mu$m by a wet process.

However, though the wet process can provide fine powders of perovskite-type compounds, it has the defect that the obtained products are poor in crystallinity because the reaction does not sufficiently proceed as compared with perovskite-type compounds obtained by a solid phase reaction and also because the products contain a large quantity of water in the crystal structure.

Accordingly, the fine particulate perovskite-type compounds obtained by the above-mentioned wet process have the defect that if they are dispersed and incorporated with a binder in an aqueous system when calcining them at a temperature at which no growth of particles occurs and used as a raw material for ceramic thin films, a water-soluble component deposits in the forming and drying steps, and the thus obtained ceramics have a nonuniform composition and show a large scatter in physical properties and electric properties.

Also, although it is possible in an oil system to disperse the fine perovskite-type compound powder obtained by the above-mentioned wet process and additives, it is difficult to sufficiently control the reaction of the perovskite-type compound and the additives at the time of firing, and the ceramics after firing show a scatter in physical and electric properties like those obtained by dispersing in an aqueous system because the degree of the progress of reaction of the perovskite-type compound is low and because the crystallinity is insufficient.

In order to eliminate the above defect, the crystallinity may be improved by raising the calcination temperature so as to make the reaction progress sufficiently. However, if the calcination temperature is raised, the growth of particles takes place and the particles characteristics as fine particles are lost, thus the products become those similar to perovskite-type compounds obtained by the solid phase reaction and cannot be used for thin film formation and miniaturization of ceramics.

Perovskite-type compounds having a large average particle size obtained by the solid phase reaction must be finely divided by mechanical pulverization. When they are pulverized, introduction of impurities from the pulverization media is unavoidable. Since these contaminants cannot be separated, they are an obstacle to forming thin films, ceramics and controlling the electric properties of capacitors.

Also, the powder obtained by pulverization is wide in its distribution of particle sizes and is poor crystal form (broken). Accordingly, when it is used as electro-ceramics, it is difficult to control the electric properties of devices.

In particular, barium titanate has been commonly used as the raw material for electro-ceramics among perovskite-type compounds. Barium titanate obtained by the above-mentioned solid phase reaction has a tetragonal crystal form, and barium titanate obtained by the above-mentioned wet process has pseudo-cubic crystal form. In order to obtain ceramic thin films having high performances, it is desirable that the barium titanate is tetragonal crystals and has a small average particle size for the purposes of achieving dense fine grained ceramic films. However, while wet process provides barium titanate having a small average diameter, it has the disadvantages as mentioned above. On the other hand, barium titanate obtained by the solid phase reaction is tetragonal crystals, but it has the disadvantage of requiring a pulverization operation because of its large average diameter. Moreover, the pulverized barium titanate contains impurities and has a wide distribution of particle size. No particles having a narrow distribution of particle size are obtained by pulverization. Further, if the barium titanate is finely pulverized to 0.3 $\mu$m or less, the crystal form changes from tetragonal form to cubic or amorphous form.

Barium titante obtain from the solid phase reaction originally shows tetragonal crystal form at room temperature and causes crystal transition to cubic crystal form at the Curie point in the vicinity of 120° C.

Conventional barium titanate particles obtained by the solid phase reaction having a tetragonal crystal form, undergo crystal transition to cubic crystal form by heating to more than the Curie point. However, barium titanate obtained by a low temperature wet process shows cubic crystal form at room temperature. This cubic barium titanate obtained by the wet process has a longer crystal axial length compared to the crystal axial length of the cubic crystal form shown by tetragonal barium titanate at a temperature above the Curie point when the both are compared at a temperature above the Curie point and, therefore, barium titanate which shows cubic crystal form at room temperature is often expressed as pseudo-cubic crystals for distinguishing between the two forms.

In case of the pseudo-cubic barium titanate, the axial length decreases as the calcination proceeds, and finally reaches the axial length that cubic barium titanate should have originally. The pseudo-cubic barium titanate that has decreased its crystal axial length by calcination to the short crystal axial length, shows tetragonal crystal form when cooled to room temperature below the Curie point.

The unit cell of tetragonal barium titanate has axial lengths (a, a, c), and it is recognized that the ratio of lattice constants, namely the c/a ratio, is 1.01.

Barium titanate whose crystal axial length has not been sufficiently decreased by calcination, does not change into tetragonal crystals when cooled to room temperature below the Curie point, and it remains as it was (cubic form). When calcining at a temperature of 700° to 900° C., there are cases where the calcined products show a clear difference between the axial length and the axial length as if they are tetragonal crystals. However, the c/a ratio of such products is not more than 1.008, and they do not show the presence of definite Curie point when observed by differential thermal analysis (DTA) even if heated above the Curie point.

In other words, exactly speaking, barium titanate which shows pseudo-cubic crystal form at room temperature and barium titanate whose c/a ratio is not more than 1.008 are distinct from tetragonal barium titanate as obtained by the solid phase process, the c/a ratio of which is not less than 1.009. The values for the c/a ratio of commercially available barium titanates prepared by a solid phase process calculated by rounding to three decimals the c/a ratio measured from X-ray diffraction peaks for (200) and (002) planes are not less than 1.009, and most of them are 1.010.

Since, as mentioned above, fine particles of perovskite-type compounds cannot be obtained by the solid phase reaction and since the conventional wet processes provide only perovskite-type compounds insufficient in the degree of the progress of reaction and the crystallinity, there has been a problem that ceramics having good characteristics cannot be obtained.

Accordingly, an object of the present invention is to provide a process according to which fine particulate perovskite-type compounds having a good crystallinity can be easily prepared.

Another object of the present invention is to provide a tetragonal barium titanate fine powder having average particle size of not more than 0.3 μm and a good crystallinity, that the difference between the a axial length and the c axial length is definite, and the c/a ratio calculated from (002) and (200) peaks of X-ray diffraction pattern is not less than 1.009, and which definitely shows the Curie point observed by DTA.

These and other objects of the present invention will become apparent from the description hereinafter.

The term "pseudo-cubic barium titanate" as used herein means barium titanate whose X-ray diffraction pattern at room temperature shows cubic crystal form, and barium titanate for which the separation of X-ray diffraction peaks derived from (200) plane and (002) plane is indefinite because the c/a ratio is not more than 1.008.

With respect to other perovskite-type compounds which are cubic crystals at room temperature, in order to conform to the expression of the crystal system for barium titanate, those prepared by a wet process and poor in crystallinity due to a longer crystal axial length are also expressed as pseudo-cubic crystals in the specification.

SUMMARY OF THE INVENTION

The present inventors have found that a powder of a perovskite-type compound containing an excess group A element obtained by a wet reaction of an aqueous solution of a mixture of a compound of a group A element and a compound of a group B element in a group A element excess A/B atomic ratio, causes the growth of particles in calcination at a higher temperature than a powder of a perovskite-type compound in the neighborhood of A/B atomic ratio of 1, and that when the perovskite-type compound powder containing an excess group A element is calcined at a temperature lower than the temperature at which the growth of particles occurs and the resulting calcined product is washed with an acid solution and then with water and is filtered to remove the excessive group A element, the reaction proceeds sufficiently and furthermore a fine powder of perovskite-type compound having a good crystallinity is easily obtained. Thus, the present inventors have accomplished the present invention.

The present invention provides a process for preparing a fine powder of perovskite-type compounds having an average particle size of at most 0.3 μm, which comprises reacting an aqueous solution of a mixture of at least one compound selected from the group consisting of group A element compounds comprising a bivalent metal element selected from the group consisting of Mg, Ca, Sr, Ba and Pb and at least one compound selected from the group consisting of group B element comprising compounds a tetravalent metal element selected from the group .consisting of Ti, Zr, Hf and Sn and/or a composite metal element composed of a bivalent or trivalent metal element selected from the group consisting of Zn, Ni, Co, Mg, Fe and Sb and a pentavalent metal element selected from the group consisting of Nb and Sb in a group A element excess A/B atomic ratio, calcining the resulting powdery reaction product having a group A element excess A/B atomic ratio at a temperature lower than the temperature at which the growth of particles takes place, and removing the excess group A element of the calcined product.

According to another aspect of the present invention, there is provided a barium titanate of tetragonal crystal having an average particle size of at most 0.3 μm and having a good crystallinity of such a degree that a and c are definitely different and the c/a ratio calculated from (002) and (200) peaks of the X-ray diffraction pattern is not less than 1.009, and it definitely shows the Curie point observed by DTA.

BRIEF DESCRIPTION OF THE DRAWINGS

FIGS. 3A and 3B are X-ray diffraction patterns of a barium titanate fine powder obtained in Example 1 after a wet reaction and prior to the calcination in a barium excess state, wherein FIG. 3A is the X-ray diffraction pattern at diffraction angle 2 $\theta$ of 10° to 50°, FIGS. 4A and 4B are X-ray diffraction patterns of a tetragonal barium titanate fine powder obtained in Example 1, wherein FIG. 4A is the X-ray diffraction pattern at diffraction angle 2 $\theta$ of 10° to 50°.

DETAILED DESCRIPTION

In the present invention, as the forms of the above-mentioned group A element compounds and group B element compounds, there are mentioned, for example, hydroxides, oxides, organometallic compounds, salts, and the like.

Upon reacting the group A element compounds with the group B element compounds, commercially available compounds may be directly used or synthesized compounds may be used as the group A element compounds and the group B element compounds.

In case that hydroxides or oxides of group B elements are used as the group B element compounds, those having an average particle size of at most 0.3 $\mu$m, preferably at most 0.1 $\mu$m, are suitable. When the average particle size is more than 0.3 $\mu$m, the reaction becomes difficult.

Also, upon the reaction, it is necessary that both the group A element compounds and the group B element compounds to be used have particle sizes of not larger than the particle size of the objective fine powder of perovskite-type compound, unless they dissolve at the time of the reaction.

Upon the reaction, at least one compound selected from the group A element compounds and at least one compound selected from the group B element compounds are admixed in such an A/B atomic ratio that the gruop A element is in excess. In the present invention, the A/B atomic ratio means an atomic ratio of the group A elements to the group B elements. The above mixing can be conducted in a usual mixing manner.

In the present invention, a coprecipitation method, a hydrolysis method, a hydrothermal synthesis method, an atmospheric thermal reaction method, etc. are adopted for the wet reaction.

The coprecipitation method is a method wherein a solution of a mixture of a salt of group A element and a salt or hydroxide of group B element is reacted with an alkali, thereby giving a mixture of hydrated oxides or hydroxides of group A element and group B element, or a mixture of a salt of group A element and a salt of group B element is added dropwise to an organic acid such as oxalic acid or citric acid to react them, thereby giving a water-insoluble composite organic acid salt.

The hydrolysis method is a method wherein water is added to an alcohol solution of a mixture of metal alkoxides to carry out the hydrolysis, thereby producing perovskite-type compounds.

The hydrothermal synthesis method is a method wherein an aqueous solution of a mixture of at least one compound selected from compounds of group A elements and at least one compound selected from compounds of group B elements is adjusted with an alkali to a DH under which the reaction proceeds, usually to a pH of not less than 10, to give an alkaline aqueous solution of the mixture, and it is reacted under pressure and usually at a temperature of 100° to 800° C.

The atmospheric thermal reaction method is a method wherein the reaction is carried out by boiling the above-mentioned alkaline aqueous solution of the mixture under atmospheric pressure.

In the present invention, all of these wet methods can be adopted. That is to say, the reaction methods are used properly in accordance with the kind and purity of desired perovskite-type compounds and the kind of the group A element compounds and group B element compounds used.

The reaction product obtained by a wet method, namely a perovskite-type compound, a mixture of coprecipitated hydroxides, a composite organic acid salt and the like, is washed with water and filtered as occasion demands. This is for removing elements remaining even after calcination when compounds other than components of perovskite-type compounds are used for the wet reaction. For example, when the reaction is carried out in a strong base, it is necessary to remove Na, K, etc. In these cases, neutralization with carbonic acid or acetic acid may be conducted followed by washing with water and filtration.

In the present invention, drying can be made in a usual drying manner, but it is preferable to conduct the drying so that the unreacted group A element used in excess and the reaction product are obtained in a uniform powder form. As the drying method for this purpose, for example, spray drying may be adopted, or after insolubilizing the unreacted group A element with carbonate ion or oxalate ion, usual filtration and drying may be conducted.

The reaction product powder having a group A element excess A/B atomic ratio obtained in a manner as mentioned above is calcined at a temperature lower than the temperature at which the growth of particles takes place. The calcination of the reaction product powder having a group A element excess A/B atomic ratio is explained in detail below.

The reaction product obtained by a wet process is, when the reaction product is a perovskite-type compound, in the form of a powder, the average particle size of which is usually at most 0.3 $\mu$m and most of which has a particle size of 0.05 to 0.15 $\mu$m, although varies somewhat depending on the kind of the compound. When the reaction product is a mixture of coprecipitated hydroxides or a composite organic, acid salt, thermal treatment thereof at a temperature of 500° to 900° C. provides a perovskite-type compound powder, the average particle size of which is at most 0.3 $\mu$m and most of which falls within the range of 0.05 to 0.15

μm. These reaction products are usually calcined for the purpose of removing free water or crystal water, improving the crystallinity or accelerating the reaction of unreacted components.

The higher the calcination temperature, the more the above purposes are achieved, but on the other hand, the growth of particles takes place. For such a reason, the calcination is carried out usually at a temperature lower than the temperature at which the growth of particles takes place. The temperature at which the grain growth takes place varies depending on the kind of the perovskite-type compounds, but in case of the same perovskite-type compound, it varies depending on the A/B atomic ratio. In case of the group A element excess A/B atomic ratio, the particle growth-occurring temperature becomes 100° to 300° C. higher than that in case of the A/B atomic ratio=1. Accordingly, in the present invention, it is possible to carry out the calcination at a higher temperature than conventional perovskite-type compounds having an A/B atomic ratio of 1 stoichiometric ratio. In usual, the calcination is carried out at a temperature which is lower than the particle growth-occurring temperature and is higher than the temperature at which the growth of particles occurs when A/B is 1.0, preferably at a temperature which is more than (particle not growth-occurring temperature—20° C.), especially (particle growth-occurring temperature—50° C.) and is not less than (particle growth-occurring temperature—300° C.), especially (particle growth-occurring temperature—200° C.).

In the present invention, a group A element excess A/B atomic ratio can be a ratio having an A/B atomic ratio of 1.01 to 1.40, preferably 1.01 to 1.10, more preferably 1.02 to 1.04. That is to say, although it varies depending on the kind of the perovskite-type compounds, when the A/B atomic ratio is less than 1.01, the effect of raising the particle growth-occurring temperature is small, and when the A/B atomic ratio exceeds 1.40, crystalline compounds other than perovskite-type compounds may be produced, and also when removal of excess group A element by an acid treatment in a later step is taken into consideration, it is uneconomical.

Explaining concretely the relationship between the A/B atomic ratio and the particle growth-occurring temperature with reference to barium titanate pseudo-cubic crystals having an average particle size of 0.1 μm, barium titanate having a Ba/Ti atomic ratio of 1 does not cause the particle growth until 800° C., and is in the pseudo-cubic form wherein contraction of lattice constant resulting from elimination of crystal water is developed in X-ray diffraction. When it is calcined at a temperature over 900° C., the grain growth is observed, and the calcination at 1,000° C. converts it into tetragonal barium titanate having an average particle size of 0.5 μm or more. On the other hand, when the Ba/Ti atomic ratio is more than 1, and the calcination is at a temperature of 1,000° to 1,100° C. there is obtained tetragonal barium titanate with a particle growth of 0.1 to 0.2 μm. In the present invention, it is required to calcine the reaction product powder containing an excess group A element at a temperature lower than the temperature at which the particle growth occurs. The temperature lower than the temperature at which the particle growth occurs means a temperature lower than the temperature at which the particles grow to particles having an average particle size of more than 0.3 μm.

In order to produce the reaction product where the A/B atomic ratio falls within the range of 1.01 to 1.40, it is necessary to adjust the A/B atomic ratio within the range of 1.01 to 1.40, preferably 1.02 to 1.04, for the aqueous solution of a mixture having a group A element excess A/B atomic ratio prior to the reaction.

After the calcination, the obtained calcined product is cleaned with an acid solution, rinsed with water and filtered, thereby removing the excessive group A element. As the acids used therefor, any of water-soluble acids are usable. For example, organic acids such as acetic acid and inorganic acids such as hydrochloric acid, nitric acid and hydrofluoric acid can be used, as long as acids which precipitate as salts are not used.

The cleaning of the calcined product with an acid solution can be conducted in a usual manner. For example, there can be adopted a method wherein the calcined product is formed into a slurry, and after heating it if required, an acid is added dropwise to adjust the pH. The adjusted range of the pH to be adjusted varies to some extent depending on the kinds of perovskite-type compounds and the acids used, but it is usually from pH 5 to pH 10. Also, when the calcined product contains a large excess of the group A element, it is effective to lower the pH initially to around 10 with a strong acid such as hydrochloric acid and then adjusted to the desired pH with a weak acid such as acetic acid.

After the cleaning with the acid solution, it is sufficient to, in a usual manner, repeat decantation, conduct washing with water and filtration by a Nutsthe funnel, and dry. The washing with water and filtration after the acid cleaning is not always required to be carried out in the order of washing and filtration. The filtration may precede the washing with water, or the washing with water and the filtration may be repeated.

The fine powders of perovskite-type compounds having an average particle size of not more than 0.3 μm obtained according to the present invention (most of the powders have an average particle size around 0.1 μm, though it varies to some extent depending on the kind of the perovskite-type compounds) contain a less amount of unreacted substances than conventional fine powders of perovskite-type compounds prepared by wet methods because the reaction sufficiently proceeds, and the fine powders obtained by the present invention have a high degree of crystallinity because the crystallinity is good. Thus, they enable the formation of ceramics having good physical and electric properties and a stable quality such as small scatter in these properties. In particular, the effects are markedly exhibited in forming ceramic thin films.

Particularly, since barium titanate obtained according to the process of the present invention is in the form of tetragonal crystal particles having an average particle size of not more than 0.3 μm, especially 0.05 to 0.25 μm, and having a very narrow particle size distribution, namely a uniform particle size, it is very useful as a ceramic material. That is to say, tetragonal barium titanate is denser than the pseudo-cubic form and also chemically more stable so that it is hard to react with other additive components, and accordingly, tetragonal barium titanate has the advantage that ceramics having high performances are easily obtained. Also, since the particle size is small and uniform, it is suitable for the formation of ceramic thin films, and there can be obtained, for example, a multi-layer ceramic capacitors having a high capacity comprising thinner dielectric phases.

The particle size distribution curve of barium titanate obtained according to the process of the present invention is very sharp, and not less than 60%, especially not less than 70%, of the whole particles are present within ±0.05 μm of the average particle size. Moreover, the particles having a particle size of not less than 0.3 μm is a very few. When the average particle size is not more than 0.25 μm, the number of such particles is not more than 5% of the whole particles, and when the average particle size is not more than 0.15 μm, particles having a particle size of not less than 0.3 μm are hardly present. For example, when the average particle size is 0.2 μm, not less than 90%, especially not less than 95%, of the whole particles are present within the range of 0.1 to 0.3 μm. Such a tetragonal barium titanate having a small average particle size and a uniform particle size is novel one which has never been obtained by conventional processes.

Ceramics produced from the fine powders of perovskite-type compounds according to the present invention are suitably used in a capacitor, radio wave filter, ignition device, thermister and others in the electronic field by utilizing their excellent electric characteristics, e.g. dielectric characteristics, piezoelectric characteristics and semiconductive characteristics.

The present invention will be explained in more detail with reference to Examples.

EXAMPLE 1

To 1,800 ml of distilled water was added 200 g of an aqueous solution of titanium tetrachloride (Ti=16.5% by weight) made by Osaka Titanium Kabushiki Kaisha with stirring to give a dilute aqueous solution of titanium tetrachloride. Thereto was added 700 ml of a 5% by weight aqueous ammonia (made by Hayashi Junyaku Kogyo Kabushiki Kaisha, special grade reagent) over about 1 hour to give a slurry of hydrated titanium oxide, and it was washed with water and filtered by a Nutsche funnel to give a hydrated titanium oxide cake. The cake had a $TiO_2$ content of 11.46% by weight determined by ICP.

Distilled water is then added to 240.2 g (Ti: 0.345 mole) of the above hydrated titanium oxide cake to give a slurry containing 60 g/l of $TiO_2$. The reaction atmosphere was replaced with nitrogen, and to the slurry were added 141.2 g (Ba: 0.448 mole) of $Ba(OH)_2\cdot 8H_2O$. (made by Hayashi Junyaku Kogyo Kabushiki Kaisha, special grade reagent ) and then distilled water so that the Ba/Ti atomic ratio was 1.30. The resulting slurry was heated to the boiling temperature over about 1 hour, and the reaction was carried out at the boiling temperature for about 3 hours. After spontaneously cooling the reaction mixture to room temperature, the decantation was repeated, and the washing with water and filtration were conducted by a Nutsche funnel. To the obtained cake was added distilled water to give a slurry having a concentration of 0.9 mole/liter (calculated as $BaTiO_3$). The slurry was spray-dried using a spray dryer made by Ohkawara Kakoki Kabushiki Kaisha at an inlet temperature of 250° C. and an outlet temperature of 120° C. and at 25,000 r.p.m. in the number of revolutions of atomizer to give a barium titanate fine powder.

Figure 1:
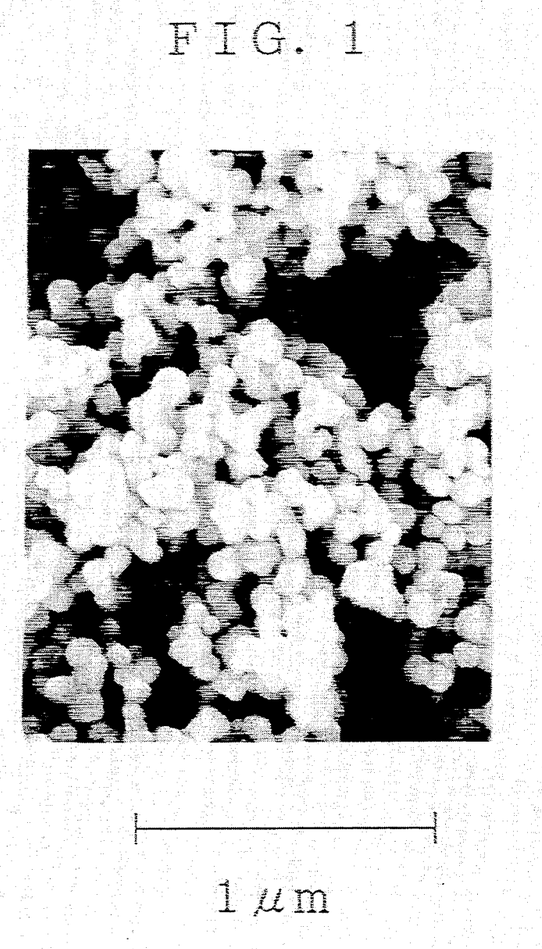
FIG. 1 is a microphotograph of a barium titanate fine powder obtained in Example 1 after a wet reaction and prior to the calcination in a barium excess state, observed by a scanning electron microscope.

A microphotograph of the obtained barium titanate fine powder observed by Scanning Electron Microscope model S-900 made by Hitachi, Ltd. is shown in FIG. 1. Also, X-ray diffraction patterns of the obtained powder observed by a X-ray diffractometer (Rotaflex RAD-RVC made by Rgaku Corp.) are shown in FIGS. 3A and 3B.

The obtained barium titanate fine powder was analyzed to determine the Ba/Ti atomic ratio by ICP and fluorescent X-ray spectroscopy, the particle size by electron microphotograph and the crystal form by X-ray diffraction. It was found that the Ba/Ti atomic ratio was 1.031, the average particle size was 0.08 μm and the product was pseudo-cubic crystals.

Figure 3A:
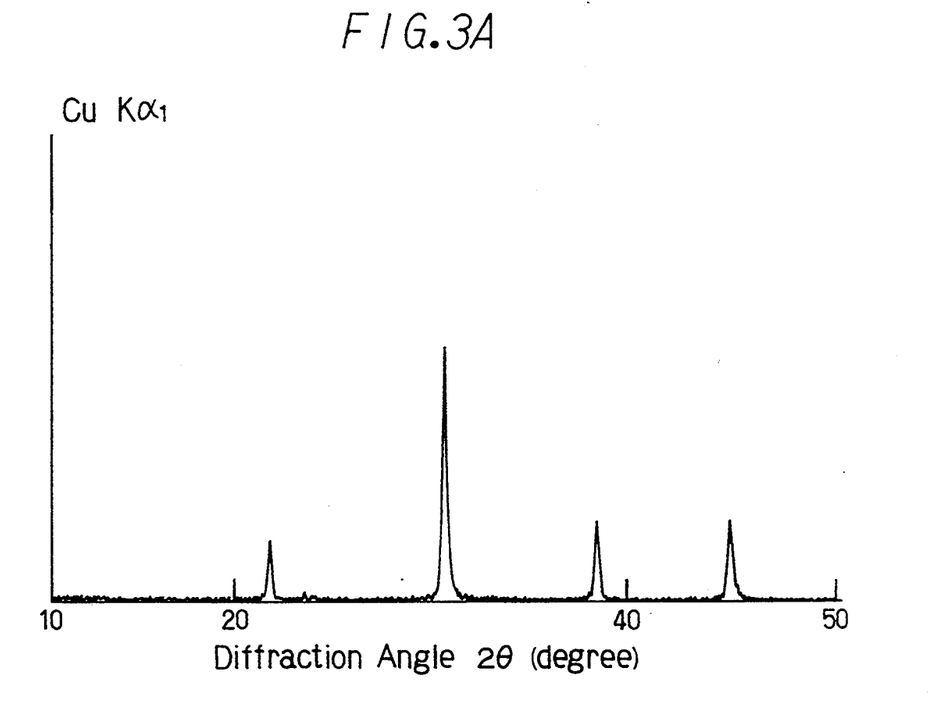
Figure 3B:
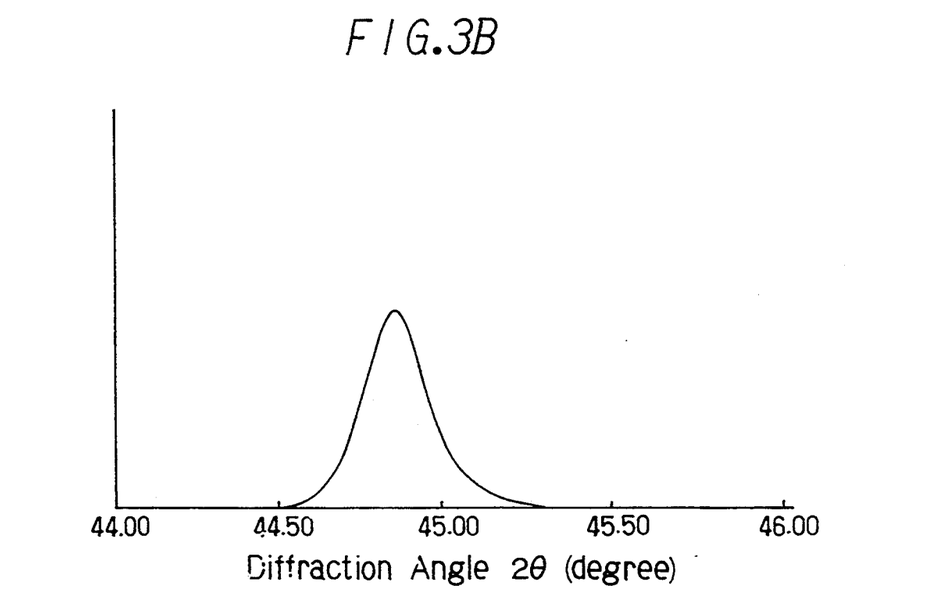
FIG. 3B is the enlarged pattern of the portion at diffraction angle 2 $\theta$ of 44° to 46° in FIG. 3A, obtained by a computer treatment to remove the peak for K$\alpha_2$ in order to observe in detail the peaks for the lattice planes (200) and (002) of barium titanate.

It is understood that according to FIGS. 3A and 3B the crystal system is cubic, but the length of the crystal lattice obtained from (200) plane is longer than that of cubic barium titanate resulting from crystal transition of tetragonal barium titanate and accordingly the product is pseudo-cubic crystals.

The above barium titanate fine powder was calcined in an electric furnace at 1,000° C. for 3 hours. After spontaneously cooling, distilled water was added to the calcined product to give a slurry of about 0.7 mole/liter ( calculated as $BaTiO_3$). The slurry was heated to 60° C., adjusted to pH 8.0 by adding dropwise a 10% by weight aqueous solution of acetic acid, and kept for about 1 hour. It was then washed with water and filtered by a Nutsche funnel and was dried to give a barium titanate fine powder.

Figure 2:
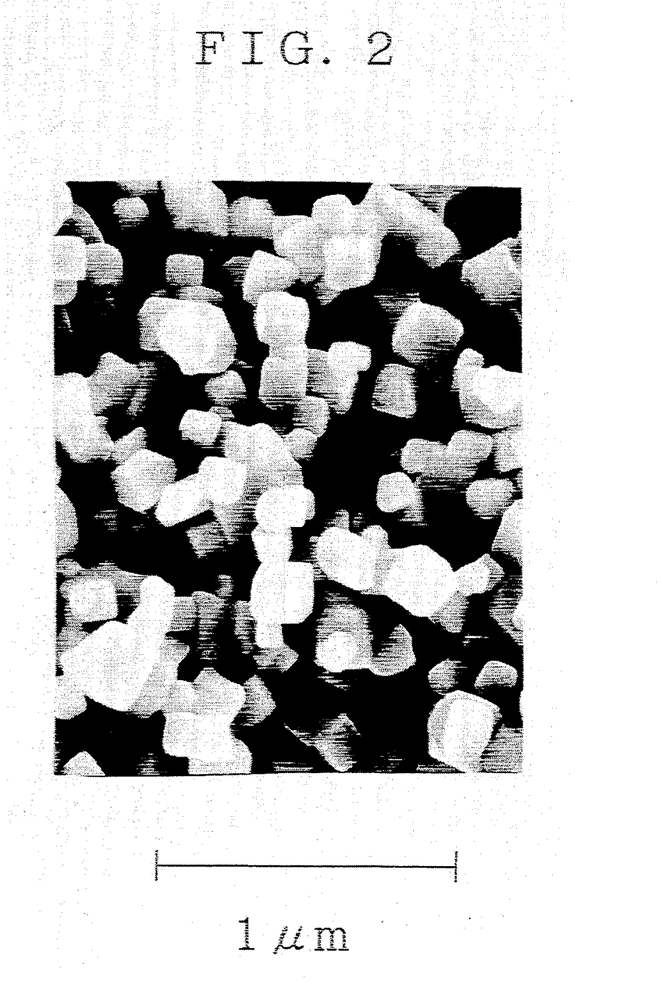
FIG. 2 is a microphotograph of a tetragonal barium titanate fine powder obtained in Example 1, observed by a scanning electron microscope.
Figure 4A:
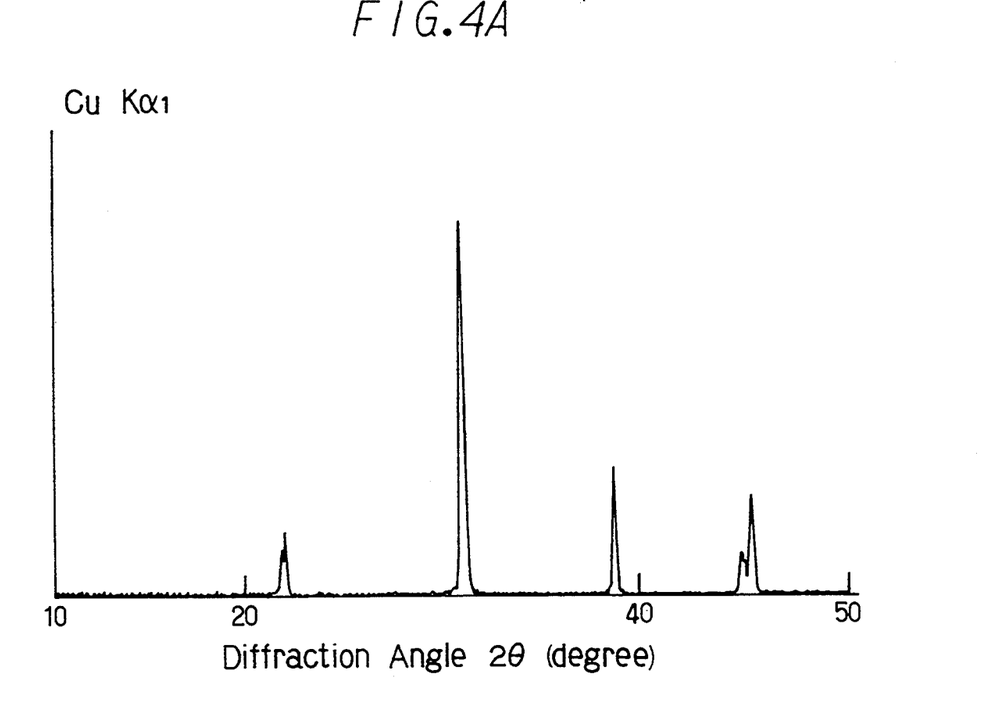
Figure 4B:
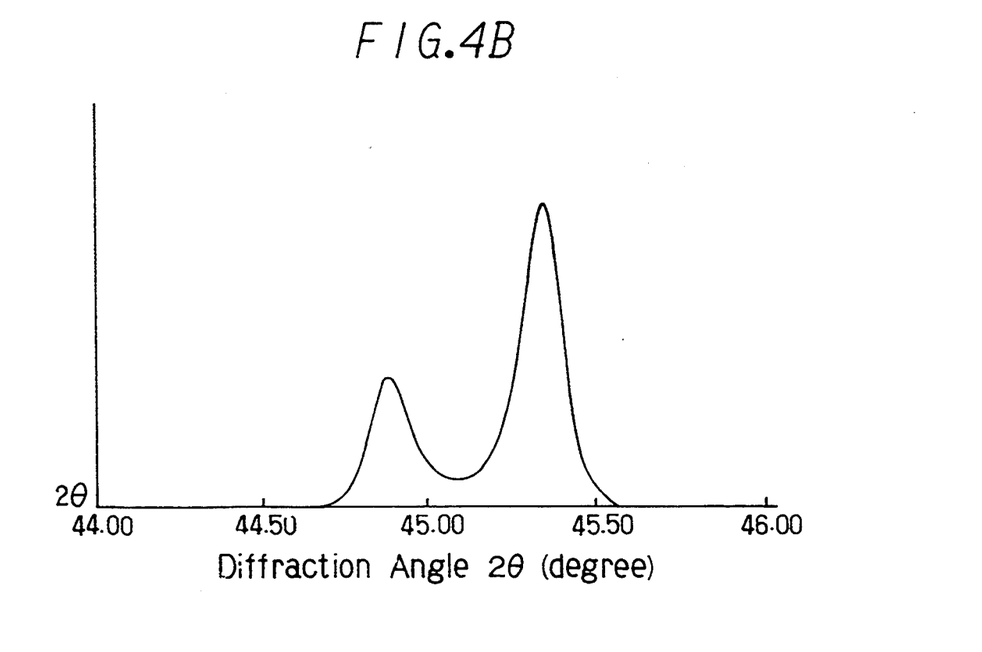
FIG. 4B is the enlarged pattern of the portion at diffraction angle 2 $\theta$ of 44° to 46° in FIG. 4A, obtained by a computer treatment to remove the peak for K$\alpha_2$ in order to observe in detail the peaks for the lattice planes (200) and (002) of barium titanate.

A microphotograph of the thus obtained barium titanate fine powder (product obtained by calcination followed by acid cleaning) observed by a scanning electron microscope and X-ray diffraction patterns thereof are shown in FIG. 2 and FIGS. 4A and 4B, respectively.

The obtained barium titanate fine powder was analyzed to determine the Ba/Ti atomic ratio by ICP and fluorescent X-ray spectroscopy, and the crystal form by electron microphotograph and X-ray diffraction. It was found that the Ba/Ti atomic ratio was 1.002, and that the crystal form was tetragonal, since the peak positions agreed with those of tetragonal barium titanate ($BaTiO_3$) shown in ASTM and a quadrilateral shape with crystal edge was seen in the electron microscopic observation.

In FIGS. 4A and 4B, there are observed separation of peaks for (100) plane and (001) plane and separation of peaks for (200) plane and (002) plane, and accordingly it is understood that the product is tetragonal barium titanate.

Also, the c/a ratio obtained from (200) plane and (002) plane was 1.010 and well agreed with the value 1.011 calculated from data in ASTM and also with the value 1.010 obtained from a commercially available barium titanate (BT-HP3 made by Kyoritsu Yogyo Kabushiki Kaisha) prepared by a solid phase method.

Moreover, in differential thermal analysis, there was clearly observed an endothermic peak resulting from the phase transition at Curie point from tetragonal crystal form to cubic crystal form.

Further, the average particle size and the particle size distribution were measured from the electron microphotograph of the obtained barium titanate fine powder. The measurement was made by drawing horizontal lines at constant intervals on the electron microphotograph, and the diameters of 3,000 particles on the lines were measured. Since the shade of the particles was a rectangular parallelepiped, the length of a side was regarded as the diameter. The results of the measurement of the particle size distribution (proportion based on the whole number of particles) and the average particle size are shown below.

| (Particle size distribution) | |
| --- | --- |
| above 0.3 μm | 4% |
| 0.25 to 0.3 μm | 11% |
| 0.2 to 0.25 μm | 36% |
| 0.15 to 0.2 μm | 34% |
| 0.1 to 0.15 μm | 12% |
| below 0.1 μm | 3% |
| Average particle size: 0.2 μm | |

In the following Examples and the like, the analysis of products and the measurement means are the same as in Example 1.

EXAMPLE 2

A hydrated titanium oxide-$Ba(OH)_2 \cdot 8H_2O$ mixed slurry prepared in the same manner as in Example 1 was adjusted to 0.7 mole/liter (calculated as $BaTiO_3$) and Ba/Ti atomic ratio of 1.20, and 500 ml of the slurry was placed in a heat resistant nickel alloy autoclave (1 liter in volume). The slurry was heated at a rate of 100° C./hour with stirring at 500 r.p.m. and reacted at 250° C. for 2 hours.

After the reaction, the reaction mixture was washed with water, filtered, formed into slurry again and spray-dried in the same manner as in Example 1 to give a barium titanate fine powder. The obtained barium titanate fine powder was pseudo-cubic crystals having a Ba/Ti atomic ratio of 1.052 and an average particle size of 0.1 μm.

The above barium titanate fine powder was calcined in an electric furnace at 1,000° C. for 3 hours. After spontaneous cooling, the calcined product was formed into an about 0.7 mole/liter slurry (calculated as $BaTiO_3$) and heated to 60° C. To the slurry was added dropwise a 10% by weight aqueous solution of acetic acid to adjust to pH 8.0, and after keeping for about 1 hour, it was washed with water and filtered by a Nutsche funnel and was dried to give a barium titanate fine powder.

The obtained barium titanate fine powder was tetragonal crystals having a Ba/Ti atomic ratio of 1.000 and an average particle size of 0.15 μm. The c/a ratio thereof was 1.010. The results of the measurement of particle size distribution are shown below.

| (Particle size distribution) | |
| --- | --- |
| above 0.25 μm | 5% |
| 0.2 to 0.25 μm | 11% |
| 0.15 to 0.2 μm | 33% |
| 0.1 to 0.15 μm | 41% |
| below 0.1 μm | 10% |

EXAMPLE 3

In 150 ml of isopropanol (made by Hayashi Junyaku Kogyo Kabushiki Kaisha, special grade reagent) was dissolved 100 g of titanium isopropoxide having a purity of 99.99% (made by Rare Metal Kabushiki Kaisha), and the resulting solution was refluxed under heating for 2 hours. In a nitrogen atmosphere, the titanium isopropoxide solution was gradually added dropwise over 1.5 hours by a roller pump to 840.5 g of a 45% by weight aqueous solution of $Ba(OH)_2 \cdot 8H_2O$ kept at 80° C. After the addition, water was added to the solution to adjust the slurry concentration to 0.6 mole/liter and the Ba/Ti atomic ratio to 1.4. Thereafter, the reaction, washing with water, filtration and spray-drying were carried out in the same manner as in Example 1 to give a barium titanate fine powder. The obtained barium titanate fine powder was pseudo-cubic crystals having a Ba/Ti atomic ratio of 1.101 and an average particle size of 0.06 μm.

The above barium titanate fine powder was calcined in an electric furnace (made by Motoyama Kabushiki Kaisha) at 1,100° C. for 3 hours. After spontaneous cooling, the calcined product was formed into an about 0.3 mole/liter slurry (calculated as $BaTiO_3$) and kept at 60° C. under heating. After adding dropwise a in hydrochloric acid to this slurry to adjust to pH 9.7, a 10% by weight aqueous solution of acetic acid was added dropwise to adjust to pH 7.8, and was kept for about 1 hour. Thereafter, the slurry was washed with water and filtered by a Nutsche funnel and dried to give barium titanate fine powder.

The obtained barium titanate fine powder was tetragonal crystals having a Ba/Ti atomic ratio of 0.9990 and an average particle size of 0.13 μm. The c/a ratio thereof was 1.010. The results of the measurement of particle size distribution are shown below.

| (Particle size distribution) | |
| --- | --- |
| above 0.2 μm | 5% |
| 0.15 to 0.2 μm | 30% |
| 0.10 to 0.15 μm | 35% |
| below 0.10 μm | 10% |

EXAMPLE 4

In a nitrogen atmosphere, 75.83 g (0.297 mole) of barium isopropoxide having a purity of 99.99% (made by Rare Metal Kabushiki Kaisha) and 92.75 g (0.326 mole) of titanium isopropoxide having a purity of 99.99% (made by Rare Metal Kabushiki Kaisha) were dissolved in 350 ml of isopropanol, and the solution was refluxed under heating for 2 hours. To the resulting solution was added dropwise 65 ml of distilled water over 1 hour to hydrolyze the alcoholates. After cooling to room temperature, water was added to the solution to adjust the slurry concentration to 0.5 mole/liter (calculated as $BaTiO_3$) and the Ba/Ti atomic ratio to 1.1. Thereafter, the reaction was carried out in the same manner as in Example 1, the washing with water and filtration by a Nutsche funnel were omitted, and the reaction mixture was spray-dried as it was to give a pseudo-cubic barium titanate fine powder having a Ba/Ti atomic ratio of 1.102 and an average particle size of 0.05 μm.

Thereafter, the calcination and the acid treatment were carried out in the same manner as in Example 3 to give a tetragonal barium titanate fine powder having a Ba/Ti atomic ratio of 1.000 and an average particle size of 0.10 μm. The c/a ratio of the product was 1.010. The particle distribution size is shown below.

| (Particle size distribution) | |
| --- | --- |
| Above 0.15 μm | 8% |
| 0.1 to 0.15 μm | 41% |
| 0.05 to 0.1 μm | 51% |

EXAMPLE 5

To 300 ml of distilled water was added 200 g of an aqueous solution of titanium tetrachloride (Ti=16.5% by weight, 0.688 mole) made by Osaka Titanium Kabushiki Kaisha with stirring to give a dilute aqueous solution of titanium tetrachloride. Then, 185 g (0.756 mole) of barium chloride ($BaCl_2 \cdot 2H_2O$) was dissolved in 2,000 ml of distilled water, and to the resulting aqueous solution kept at 20° C. was gradually added the above aqueous titanium tetrachloride solution. On the other hand, 189 g (1.5 moles) of oxalic acid [$(COOH)_2 \cdot 2H_2O$] was added to 1,000 ml of distilled water to form an aqueous solution, and it was kept at 80° C. To this aqueous oxalic acid solution was added dropwise the above titanium tetrachloride-barium chloride mixed aqueous solution over 3 hours to produce a white precipitate. After the decantation was repeated and the washing with water and filtration were conducted with a Nutsche funnel, it was dried to give a $BaTiO(C_2O_4) \cdot 4H_2O$ composite salt powder. The powder was calcined at 600° C. for 10 hours to give a pseudo-cubic barium titanate fine powder having a Ba/Ti atomic ratio of 1.05 and an average particle size of 0.2 μm.

Thereafter, the calcination and the acid treatment were carried out in the same manner as in Example 2 to give a tetragonal barium titanate fine powder having a Ba/Ti atomic ratio of 1.001 and an average particle size of 0.22 μm. The c/a ratio of the product was 1.010. The particle size distribution is as shown below.

| (Particle size distribution) | |
| --- | --- |
| above 0.3 μm | 3% |
| 0.25 to 0.3 μm | 33% |
| 0.2 to 0.25 μm | 34% |
| 0.15 to 0.2 μm | 30% |

EXAMPLE 6

Distilled water was added to 200 g of a hydrated titanium oxide cake (11.46% by weight) prepared in the same manner as in Example 1 to adjust the slurry concentration to 60 g/liter. After replacing the atmosphere of the reaction system by nitrogen, 107.1 g of $Sr(OH)_2 \cdot 8H_2O$ (made by Hayashi Junyaku Kogyo Kabushiki Kaisha, special grade reagent) was added to the slurry and admixed. After adjusting the final slurry concentration to 0.5 mole/liter (calculated as $SrTiO_3$) by addition of water, the reaction was carried out in the same manner as in Example 1. After the reaction, the reaction mixture was washed with water and filtered by a Nutsche funnel and spray-dried to give a pseudo-cubic strontium titanate fine powder having a Sr/Ti atomic ratio of 1.07 and an average particle size of 0.06 μm.

The above strontium titanate fine powder was calcined at 1,150° C. for 3 hours, and after adjusting to pH 7.6, the acid treatment, washing with water, filtration and drying were carried out in the same manner Example 1 to give a cubic strontium as in titanate fine powder having a Sr/Ti atomic ratio of 0.998 and an average particle size of 0.1 μm.

EXAMPLE 7

To 200 g of a hydrated titanium oxide cake (11.46% by weight, 0.286 mole) prepared in the same manner as in Example 1 was added distilled water to adjust the slurry concentration to 60 g/liter. After replacing the atmosphere of the reaction system by nitrogen, 79.0 g (0.25 mole) of $Ba(OH)_2 \cdot 8H_2O$ (made by Hayashi Junyaku Kogyo Kabushiki Kaisha, special grade reagent) and 27.4 g (0.1 mole) of $Sr(OH)_2 \cdot 8H_2O$ (made by Hayashi Junyaku Kogyo Kabushiki Kaisha, special grade reagent) were added to the above slurry.

Thereafter, the reaction was carried out in the same manner as in Example 1, and after the reaction, the washing with water and filtration by a Nutache funnel and the spray-drying were carried out to give a pseudo-cubic barium-strontium titanate fine powder having a Ba/Ti atomic ratio of 0.780, a Sr/Ti atomic ratio of 0.314 and a (Ba+Sr)/Ti atomic ratio of 1.094 and having an average particle size of 0.05 μm.

The above barium-strontium titanate fine powder was calcined at 1,050° C. for 3 hours, and after adjusting to pH 8.0 in the same manner as in Example 1, the acid treatment, washing with water, filtration and drying were carried out to give a cubic barium-strontium titanate fine powder having a Ba/Ti atomic ratio of 0.7031, a Sr/Ti atomic ratio of 2.998 and a (Ba+Sr)/Ti atomic ratio of 1.0029 and having an average particle size of 0.08 μm.

EXAMPLE 8

To 2 liters of pure water was added 129 g (0.4 mole) of $ZrOCl_2 \cdot 8H_2O$ (made by Hayashi Junyaku Kogyo Kabushiki Kaisha, special grade reagent), and after dissolving it, 470 g (1.6 moles) of an aqueous solution of titanium tetrachloride (Ti=16.5% by weight) made by Osaka Titanium Kabushiki Kaisha was added and dissolved therein.

A 5% by weight aqueous ammonia (made by Hayashi Junyaku Kogyo Kabushiki Kaisha, special grade reagent) was added to the above aqueous solution over about 1 hour and adjusted to pH 7.5, thereby giving a hydrated titanium zirconium oxide coprecipitate. The coprecipitate was washed with water and filtered by a Nutsche funnel to give a hydrated titanium zirconium oxide cake which contained 10% by weight of $TiO_2$ and 3.9% by weight of $ZrO_2$ determined by ICP.

Distilled water was then added to the above hydrated titanium zirconium oxide cake to adjust to 0.7 mole/liter (calculated as $TiO_2+ZrO_2$), and after replacing the reaction atmosphere by nitrogen, to the resulting slurry was added 173 g (Ba: 0.55 mole) of $Ba(OH)_2 \cdot 8H_2O$ (made by Hayashi Junyaku Kogyo Kabushiki Kaisha, special grade reagent) to adjust the reaction condention to Ba/(Ti+Zr)=1.40.

The above slurry was heated to the boiling temperature over about 1 hour, and the reaction was carried out at the boiling temperature for about 3 hours. The reaction mixture was spontaneously cooled to room temperature, repeatedly decanted, and washed with water and filtered by a Natsche funnel. Distilled water was added to the obtained cake to form again into a slurry having a concentration of 0.7 mole/liter [calculated as $Ba(Ti_{0.8}Zr_{0.2})O_3$]. The slurry was adjusted to pH 9.0 with acetic acid, and stirred for about 1 hour, and the washing with water and filtration were conducted by a Nutsche funnel.

The resulting cake was added with distilled water to form again into a slurry of 0.9 mole/liter [calculated as $(Ti_{0.8}Zr_{0.2})O_3$], and was spray-dried using a spray dryer made by Ohkawara Kakoki Kabushiki Kaisha at an inlet temperature of 250° C. and an outlet temperature of 120° C. and at 25,000 r.p.m. in the number of revolutions of atomizer to give a pseudo-cubic barium titanate-zirconate fine powder having a Ba/Ti atomic ratio of 1.333, a Ba/Zr atomic ratio of 5.556 and a Ba/(Ti+Zr) atomic ratio of 1.075 and having an average particle size of 0.07 μm.

Thereafter, the powder was treated in the same manner as in Example 1 except that the calcination was carried out at 1,200° C. to give a fine powder of cubic barium titanate zirconate compound having a Ba/Ti atomic ratio of 1.245, a Ba/Zr atomic ratio of 5.025 and a Ba/(Ti+Zr) atomic ratio of 0.9980 and having an average particle size of 0.2 μm.

EXAMPLE 9

In 0.1N HCl acidic solution kept at 0° C. was dissolved 135.5 g of $SnCl_4$ (made by Hayashi Junyaku Kogyo Kabushiki Kaisha, special grade reagent) with stirring to give an aqueous solution of $SnCl_4$. The resulting solution was admixed with 557.4 g of an aqueous solution of titanium tetrachloride (Ti: 16.5% by weight) made by Osaka Titanium Kabushiki Kaisha.

A 5% by weight aqueous ammonia was added to the above mixed aqueous solution to adjust to pH 7.51. It was aged for 30 minutes to give a precipitate of a hydrated tin-titanium oxide. The precipitate was washed with water and filtered by a Nutsche funnel to give a cake of the hydrated tin-titanium oxide.

Distilled water was added to 500 g of the hydrated tin-titanium oxide cake to adjust the total volume to 1 liter, and the resulting slurry was analyzed for the concentrations of Ti and Sn by IPC. It was found that Ti was 0.425 mole/liter and Sn was 0.106 mole/liter.

After replacing the reaction atmosphere by nitrogen, 201 g of $Ba(OH)_2 \cdot 8H_2O$ (made by Hayashi Junyaku Kogyo Kabushiki Kaisha, special grade reagent) was added to the slurry to adjust the Ba/(Ti+Sn) atomic ratio to 1.2. Thereafter, the reaction was carried out in the same manner as in Example 1, washed with water, filtered and spray-dried to give a pseudo-cubic barium titanate-stannate fine powder having a Ba/Ti atomic ratio of 1.299, a Ba/Sn atomic ratio of 5.263 and a Ba/(Ti+Sn) atomic ratio of 1.0417 and having an average particle size of 0.09 μm.

The above barium titanate-stannate fine powder was calcined at 1,100° C. for 3 hours, and the acid treatment was carried out by adjusting to pH 8.2 in the same manner as in Example 1, and the washing with water, filtration and drying were carried out to give a cubic barium titanate-stannate fine powder having a Ba/Ti atomic ratio of 1.253, a Ba/Sn atomic ratio of 5.025 and a Ba/(Ti+Sn) atomic ratio of 1.003 and having an average particle size of 0.11 μm.

EXAMPLE 10

To 240.2 g of a hydrated titanium oxide cake (Ti: 0.345 mole) prepared in the same manner as in Example 1 was added distilled water to form into a slurry containing 50 g/liter of $TiO_2$. After replacing the atmosphere of the reaction system by nitrogen, $Ba(OH)_2 \cdot 8H_2O$ and $CaCl_2$ were added to the slurry so that the Ba/Ti atomic ratio was 0.95, the Ca/Ti atomic ratio was 0.15 and the (Ba+Ca)/Ti atomic ratio was 1.05.

To the slurry was added NaOH to adjust to pH 14, and the reaction was carried out in the same manner as in Example 1.

After keeping the above reaction product slurry at 60° C., carbon dioxide gas was blown into to adjust to below pH 6, the washing with water, decantation and filtration were conducted, and the obtained cake was spray-dried under the same conditions as in Example 1 to give a barium-calcium titanate fine powder. The obtained fine powder was pseudo-cubic crystals having a Ba/Ti atomic ratio of 0.941, a Ca/Ti atomic ratio of 0.102 and a (Ba+Ca)/Ti atomic ratio of 1.043 and having an average particle size of 0.07 μm.

The above barium-calcium titanate fine powder was calcined and acid-treated in the same manner as in Example 1 to give a barium-calcium titanate fine powder having a Ba/Ti atomic ratio of 0.902, a Ca/Ti atomic ratio of 0.101 and a (Ba+Ca)/Ti atomic ratio of 1.003 and having an average particle size of 0.1 μm.

EXAMPLE 11

Distilled water was added to 240.2 g (Ti: 0.345 mole) of a hydrated titanium oxide cake prepared in the same manner as in Example 1 to form a slurry containing 50 g/liter of $TiO_2$. The reaction atmosphere was replaced by nitrogen, and thereto were added $Ba(OH)_2 \cdot 8H_2O$ and $MgCl_2 \cdot 6H_2O$ so that the Ba/Ti atomic ratio was 0.95, the Mg/Ti atomic ratio was 0.10 and the (Ba+Mg)/Ti atomic ratio was 1.05.

Therefore, the reaction was carried out in the same manner as in Example 10 to give a pseudo-cubic barium-magnesium titanate fine powder having a Ba/Ti atomic ratio of 0.93, a Mg/Ti atomic ratio of 0.105 and a (Ba+Mg)/Ti atomic ratio of 1.035 and having an average particle size of 0.06 μm.

The above barium-magnesium titanate fine powder was subjected to calcination and acid treatment in the same manner as in Example 1 to give a cubic barium-magnesium titanate fine powder having a Ba/Ti atomic ratio of 0.900, a Mg/Ti atomic ratio of 0.101 and a (Ba+Mg)/Ti atomic ratio of 1.001 and having an average particle size of 0.12 μm.

EXAMPLE 12

To 1.2 liters of distilled water was added 284 g (Ti: 0.98 mole) of an aqueous solution of titanium tetrachloride (Ti: 16.5% by weight) made by Osaka Titanium Kabushiki Kaisha with stirring to form a dilute aqueous solution of titanium tetrachloride. After keeping the solution at 0° C., 9.2 g (Sb: 0.04 mole) of $SbCl_3$ made by Nippon Seiko Kabushiki Kaisha was added and dissolved in the solution.

To the above mixed aqueous solution was added a 5% by weight aqueous ammonia over 1 hour, and the solution was adjusted to pH 7 to produce a white coprecipitate. The white coprecipitate was washed with water and filtered by a Nutsche funnel, and distilled water was added to the resulting cake to form 1.6 liters of a slurry. The slurry had a Ti concentration of 0.576 mole/liter and a Sb concentration of 0.024 mole/liter measured by ICP.

After replacing the reaction atmosphere by nitrogen, $Ba(OH)_2 \cdot 8H_2O$ was added to the slurry to adjust the Ba/(Ti +Sb) atomic ratio to 1.3. Thereafter, the reaction was carried out in the same manner as in Example 1, washed with water, filtered and dried to give a pseudo-cubic fine powder of a barium titanate-antimonate compound having a Ba/Ti atomic ratio of 1.053, a Ba/Sb atomic ratio of 28.57 and a Ba/(Ti+Sb) atomic ratio of 1.015 and having an average particle size of 0.07 μm.

The obtained barium titanate-antimonate fine powder was calcined and acid-treated in the same manner as in Example 9 to give a cubic barium titanate-antimonate fine powder having a Ba/Ti atomic ratio of 1.020, a Ba/Sb atomic ratio of 24.94 and a Ba/(Ti+Sb) atomic ratio of 0.980 and having an average particle size of 0.13 μm.

EXAMPLE 13

In 1.5 liters of 0.1N hydrochloric acid kept at 0° C. were dissolved 275.70 g (Ti: 0.95 mole) of a titanium tetrachloride aqueous solution (Ti: 16.5% by weight) made by Osaka Titanium Kabushiki Kaisha, 6.75 g (Nb: 0.025 mole) of niobium pentachloride (made by Mitsuwa Kagaku Yakuhin Kabushiki Kaisha) and 6.76 g (Fe: 0.025 mole) of $FeCl_3 \cdot 6H_2O$ (made by Hayashi Junyaku Kogyo Kabushiki Kaisha). A 5% by weight aqueous ammonia was added to the resulting solution over 1 hour and was adjusted to pH 7 to give a coprecipitate. The coprecipitate was washed with water and filtered by a Nutsche funnel, and distilled water was added to the obtained cake to form 1.8 liters of a slurry. The slurry had a Ti concentration of 0.527 mole/liter, a Nb concentration of 0.0138 mole/liter and a Fe concentration of 0.0137 mole/liter determined by ICP.

After replacing the reaction atmosphere by nitrogen, $Ba(OH)_2 \cdot 8H_2O$ was added to the slurry to adjust the Ba/(Ti+Nb+Fe) atomic ratio to 1.0235. Thereafter, the reaction was carried out in the same manner as Example 1 to give a pseudo-cubic fine in powder of a barium titanate-niobate ferrate compound having Ba/Ti atomic ratio 1.074, Ba/Nb atomic ratio 43.48, Ba/Fe atomic ratio 43.48 and Ba/(Ti+Nb+Fe) atomic ratio 1.0235 and having an average particle size of 0.09 μm.

The above barium titanate-niobate ferrate fine powder was calcined and acid-treated in the same manner as in Example 2 to give a cubic barium titanate-niobate ferrate fine powder having Ba/Ti atomic ratio 1.052, Ba/Nb atomic ratio 40, Ba/Fe atomic ratio 40 and Ba/(Ti+Nb+Fe) atomic ratio 0.994 and having an average particle size of 0.12 μm.

COMPARATIVE EXAMPLE 1

A barium titanate cake obtained by conducting the reaction in the same manner as in Example 1 and conducting the washing with water and filtration, was formed into a 0.6 mole/liter slurry and it was adjusted to pH 8 with acetic acid. The slurry was washed with water and filtered by a Nutache funnel and was dried to give a pseudo-cubic barium titanate fine powder having a Ba/Ti atomic ratio of 1.001 and an average particle size of 0.08 μm.

The above barium titanate fine powder was calcined at varied temperatures for 3 hours. The relationship between average particle size and crystal system of the obtained barium titanate was as follows:

| Calcination temperature | Average particle size | Crystal form |
|---|---|---|
| 800° C. | 0.09 μm | pseudo-cubic form |
| 900° C. | 0.14 μm | pseudo-cubic form |
| 1000° C. | 0.5 μm | tetragonal form |
| 1100° C. | 0.7 μm | tetragonal form |
| 1200° C. | 0.9 μm | tetragonal form |

From the above relationship between calcination temperature, average particle size and crystal form, it is found that in case of preparing a fine powder having the same particle size as barium titanate obtained in Examples 1 to 5, barium titanate prepared by a conventional wet method wherein the Ba/Ti atomic ratio is controlled to 1 must be calcined at a temperature below 900° C., thus pseudo-cubic one is only obtained.

EXAMPLE 14

The tetragonal barium titanate fine powder obtained in Example 1 was calcined at 850° C. for 3 hours, and was pulverized and dispersed in a wet state by a "Ultravisco Mill VVM-2L" made by Igarashi Kikai Kabushiki Kaisha. It was further ball-milled for 12 hours using a ball pot made of a resin.

Polyethylene glycol, butylbenzyl phthalate, nonionic octylphenoxyethanol, an acrylic resin emulsion and a wax emulsion were added to the ball pot in amounts of 3% by weight, 2% by weight, 0.2% by weight, 8% by weight and 0.1% by weight respectively based on barium titanate on solid basis, and mixed by the ball mill for 24 hours.

The obtained slurry was defoamed under vacuum with stirring, and after adjusting the viscosity to 10,000 cps, a thin film was formed by a doctor blade to give a green sheet.

Five of the above green sheets were placed on one another under a pressure of 700 kg/cm$^2$ in order to obtain the packed green sheet, and the temperature was gradually elevated at a rate of 20° C./hour from 200° C. to 500° C. After defatting, it was sintered at 1,150° C. for 2 hours to give a sintered thin film of barium titanate.

As a comparative article, barium titanate (calcined at 900° C.) obtained in Comparative Example 1 was compacted and sintered in the same manner as above.

Barium titanates of Example 1 and Comparative Example 1 used as the raw materials upon preparing the above sintered bodies in the form of thin film was pulverized by a ball mill for 12 hours and analyzed for the water-soluble component by ICP. The results are shown in Table 1.

Also, the scatter in thickness of the green sheets obtained by thin film formation with a doctor blade is shown in Table 2.

The scatter in linear shrinkage of the obtained sintered bodies (10 samples) is shown in Table 3.

The results of the electric properties (dielectric constant and dielectric loss at 20° C.) measured by a LCR Meter 4274A made by YOKOGAWA HEWLETT PACKARD CO., LTD. with respect to 10 samples of each of the obtained sintered bodies are shown in Table 4.

TABLE 1

| | Water-soluble component (weight g eluted from 100 g of BaTiO$_3$) | |
|---|---|---|
| Eluted component | Example 1 | Com. Ex. 1 |
| Ba | below 0.001 g | 1.76 g |

TABLE 2

| | Scatter in thickness of green sheet (measured at 20 points by thickness meter) | |
|---|---|---|
| | Example 1 | Com. Ex. 1 |
| Average | 26 μm | 27 μm |
| Maximum | 26.4 μm | 31 μm |
| Minimum | 25.5 μm | 22 μm |

TABLE 3

| | Scatter in linear shrinkage (10 samples) | |
|---|---|---|
| | Example 1 | Com. Ex. 1 |
| Average | 18.5% | 18.7% |

TABLE 3-continued

| Scatter in linear shrinkage (10 samples) | | |
|---|---|---|
| | Example 1 | Com. Ex. 1 |
| Maximum | 18.6% | 19.5% |
| Minimum | 18.4% | 17.3% |

(Note)
Three of 10 samples of Comparative Example 1 showed warping.

TABLE 4

| Electric properties of sintered body (10 samples) | | |
|---|---|---|
| | Example 1 | Com. Ex. 1 |
| Dielectric constant ($\epsilon$) | | |
| Average | 3980 | 3800 |
| Minimum-maximum | 3950–4000 | 3700–3950 |
| Dielectric loss (tan $\delta$) | | |
| Average (%) | 1.1 | 2.0 |
| Minimum-maximum | 1.0–1.2 | 1.1–3.5 |

As shown in Table 1, barium titanate of Example 1 showed that the water-soluble component was less than barium titanate of Comparative Example 1 corresponding to a conventional wet method and the reaction proceeded sufficiently.

Also, as shown in Tables 2 and 3, when barium titanate of Example 1 is used, the scatter in thickness of green sheet and the scatter in linear shrinkage are smaller than the case using barium titanate of Com. Ex. 1. These results show that barium titanate of Example 1 has a uniform composition and a good dispersibility because of sufficient progress of the reaction as compared with barium titanate of Com. Ex. 1.

Further, as shown in Table 4, the sintered bodies obtained using barium titanate of Example 1 have better electric properties with less scatter than those using barium titanate of Comparative Example 1. That is to say, the dielectric constant is large, the dielectric loss is small, and the scatters thereof are small. These results show that barium titanate of Example 1 has a uniform composition because of sufficient progress of the reaction as compared with that of Comparative Example 1, and moreover, the crystallinity is good and it can be sintered into high density.

In addition to the ingredients used in the Examples, other ingredients can be used in the Examples as set forth in the specification to obtain substantially the same results.

What we claims is:

1. A process for preparing a fine powder of tetragonal crystalline barium titanate having an average particle size of at most 0.3 μm, which comprises reacting an aqueous solution of a mixture of a compound containing Ba and a compound containing Ti in a Ba/Ti atomic ratio of 1.02–1.40, obtaining a powdery reaction product of barium titanate, calcining the powder reaction product having a Ba/Ti atomic ration of 1.02–1.40 at a temperature of 1,000° to 1,100° C., and removing excess Ba element from a resulting calcined product.

2. The process of claim 1, wherein the Ba compound is an hydroxide or oxide, and the Ti compound is an hydroxide or oxide.

3. The process of claim 1, wherein the Ba compound tis an hydroxide or oxide, and the Ti compound is an organometallic compound.

4. The process of claim 1, wherein the Ba compound is an organometallic compound, and the Ti compound is an hydroxide or oxide.

5. The process of claim 1, wherein the Ba compound is an organometallic compound, and the Ti compound is an organometallic compound.

6. The process of claim 1, wherein the Ba compound is barium hydroxide and the Ti compound is hydrated titanium oxide.

7. The process of claim 1, wherein the Ba compound is barium hydroxide, the Ti compound is hydrated titanium oxide, and the tetragonal barium titanate has an average particle size of 0.05 to 0.3 μm.

8. The process of claim 7, wherein the Ba/Ti atomic ratio of the powdery reaction product is from 1.02 to 1.04.

9. The process of claim 7, wherein a c/a ratio of said tetragonal barium titanate calculated from (002) and (200) peaks by X-ray diffraction pattern is not less than 1.009.

10. The process of claim 1, wherein the calcining converts the resulting powdery reaction product into a tetragonal system crystalline structure.

11. The process of claim 1, wherein the calcined product has an average particle size of at most 0.3 μm.

12. The process of claim 1, wherein tetragonal barium titanate has an average particle size of 0.05 to 0.3 μm.

* * * * *